(12) United States Patent
Smith et al.

(10) Patent No.: US 7,774,646 B2
(45) Date of Patent: Aug. 10, 2010

(54) SURVIVING STORAGE SYSTEM TAKEOVER BY REPLAYING OPERATIONS IN AN OPERATIONS LOG MIRROR

(75) Inventors: Randall Smith, Sunnyvale, CA (US); Stanley Luke, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 578 days.

(21) Appl. No.: 11/781,819

(22) Filed: Jul. 23, 2007

(65) Prior Publication Data

US 2009/0031096 A1    Jan. 29, 2009

(51) Int. Cl.
*G06F 11/00* (2006.01)
(52) U.S. Cl. .......................................... 714/13; 714/15
(58) Field of Classification Search ........................ None
See application file for complete search history.

(56) References Cited

U.S. PATENT DOCUMENTS

| | | | | |
|---|---|---|---|---|
| 5,465,328 A | * | 11/1995 | Dievendorff et al. | 714/15 |
| 5,790,775 A | * | 8/1998 | Marks et al. | 714/9 |
| 5,944,838 A | * | 8/1999 | Jantz | 714/6 |
| 6,192,365 B1 | * | 2/2001 | Draper et al. | 1/1 |
| 6,578,160 B1 | * | 6/2003 | MacHardy et al. | 714/43 |
| 6,978,398 B2 | * | 12/2005 | Harper et al. | 714/13 |
| 7,082,446 B1 | * | 7/2006 | Bottomley | 1/1 |
| 7,111,189 B1 | * | 9/2006 | Sicola et al. | 714/6 |
| 7,685,378 B2 | * | 3/2010 | Arakawa et al. | 711/154 |
| 2007/0180302 A1 | * | 8/2007 | Allen et al. | 714/6 |

* cited by examiner

*Primary Examiner*—Gabriel L Chu
(74) *Attorney, Agent, or Firm*—Cooper Legal Group, LLC (57) ABSTRACT

An apparatus and method for rapidly resuming the processing of client requests after a system failure event are disclosed. Accordingly, a surviving storage system, upon detecting a system failure event at a partner storage system, executes a takeover routine and conditions its system memory to reflect the state of the system memory of the failed storage system by processing client requests or commands stored in an operations log mirror. Then, the storage system converts the unused portion of the log mirror for use as an operations log, and resumes processing client requests prior to flushing any data to storage devices.

12 Claims, 8 Drawing Sheets

SURVIVING STORAGE SYSTEM TAKEOVER BY REPLAYING OPERATIONS IN AN OPERATIONS LOG MIRROR

FIELD OF THE INVENTION

The invention generally relates to data storage systems. More specifically, the invention relates to a method by which a data storage system rapidly recovers after a system failure, and resumes processing client-initiated requests.

BACKGROUND

In order to strike a proper balance between performance, reliability, and cost, some disk-based data storage systems temporarily read data from and write data to system memory (e.g., volatile randomly accessible memory), prior to writing data to disk storage. Because system memory is volatile, to prevent data loss in the case of a system failure, non-volatile memory is utilized to store a log of all operations that have been written into system memory, but not yet written to disk storage. Accordingly, the performance increase realized from utilizing system memory for temporarily reading and writing data is achieved without negatively impacting the reliability of the data storage system.

Figure 1:
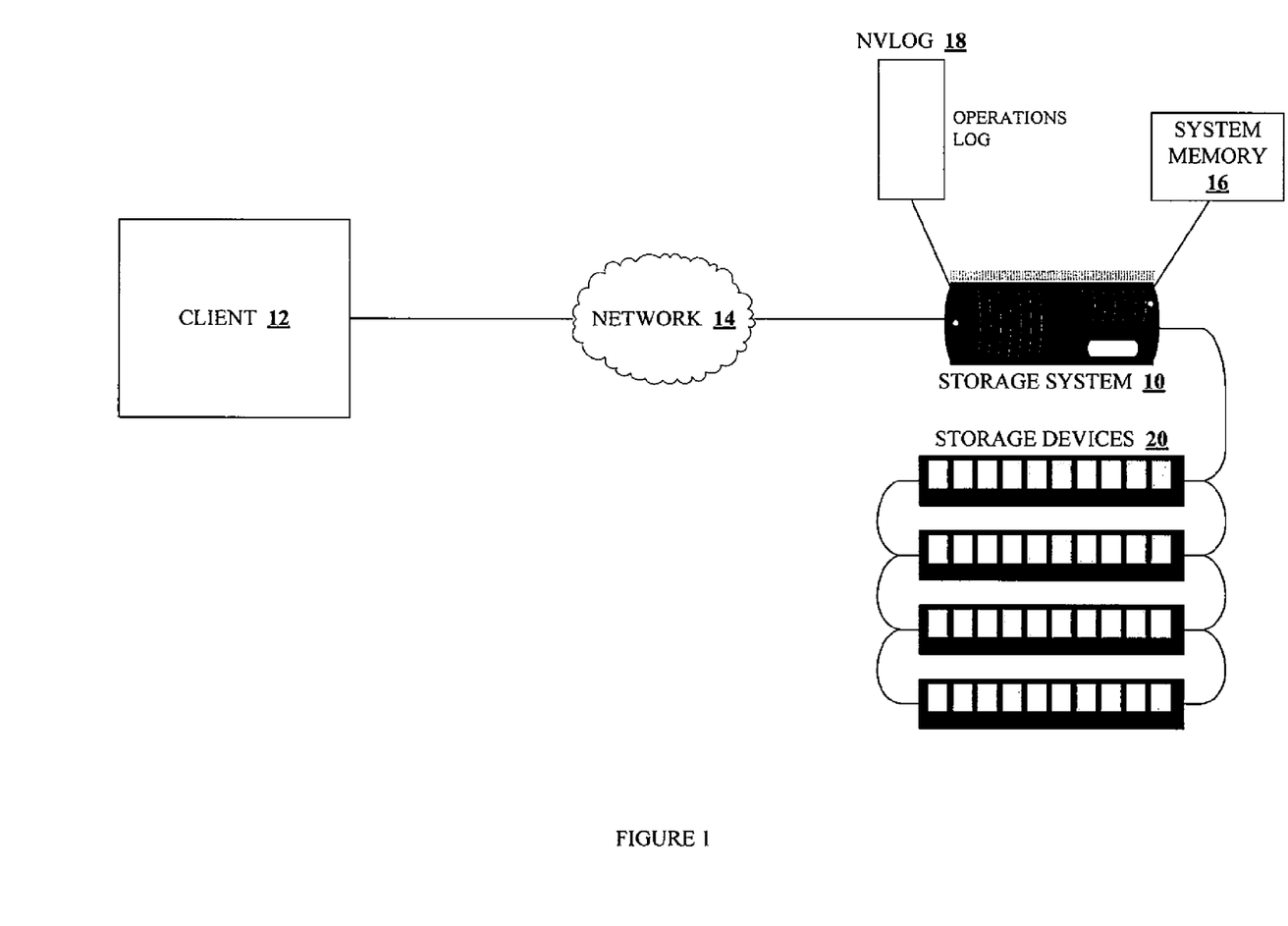
FIG. 1 illustrates a standalone storage system configured to provide a data storage service to a client over a network, according to an embodiment of the invention.

FIG. 1 illustrates an example of a network-attached storage system 10 configured to operate as described above. The storage system 10 provides a high-availability data storage service to one or more clients, such as client 12, over a network 14. As illustrated in FIG. 1, the storage system 10 includes a system memory 16 and a non-volatile memory with an operations log, NVLOG 18. In addition, the storage system 12 is connected to a group of storage devices 20 (e.g., disk drives or disk shelves).

When the storage system 10 receives a write command from the client 12, the storage system 10 logs a write operation in NVLOG 18 and then writes the data to system memory 16 on behalf of the client. If a subsequent client-initiated read command is received at the storage system 10, the storage system 10 reads the data from system memory, or from the storage devices 20, depending on whether the data are in system memory or the storage devices 20. When the system memory 16 reaches some predetermined capacity, or the operations log 18 reaches some predetermined capacity, data previously written to system memory 16 are written to disk storage 20 and the corresponding operations are cleared from the operations log, thereby freeing system memory 16 and the operations log 18 for processing new read/write commands.

Figure 2:
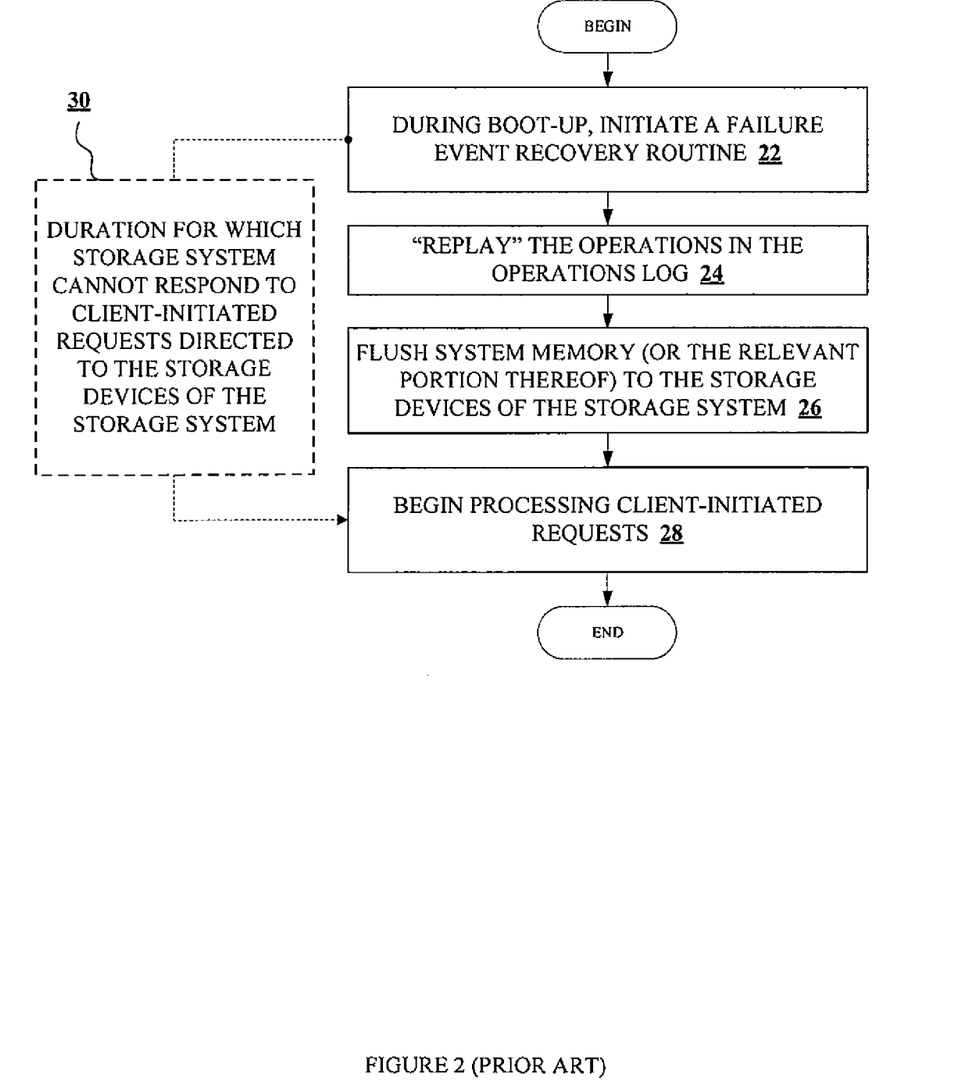
FIG. 2 illustrates a prior art method by which a data storage system recovers from a failure event.

In the event of a system failure (e.g., such as a power failure), the data stored in volatile system memory 16 may be lost. To ensure that the data are not permanently lost, a recovery process is executed. FIG. 2 illustrates a prior art example of a recovery process executed during a boot-up routine. For instance, referring to FIG. 2, at method operation 22 a recovery process is initiated during the boot-up procedure. Generally, the recovery process is initiated during the first boot-up sequence after the system failure event to ensure that a client does not attempt to access data stored in system memory and lost during the system failure event. Until the boot-up sequence has completed and the file system has been initialized, client-initiated requests directed to the storage devices 20 of the storage system 10 are not processed. This prevents a client from reading incorrect data, before such data has been returned to its proper state by the recovery routine.

At operation 24, the operations that were previously recorded in the operations log, NVLOG 18, of the non-volatile memory are "replayed". That is, each operation stored in the operations log is processed to condition the state of the system memory 16 as it was when the failure event occurred. Next, at method operation 26, the system memory (or the relevant portion thereof) is flushed (e.g., written) to the storage devices 20 of the storage system 10. Finally, at operation 28 the storage system 10 begins processing client-initiated requests directed to the storage devices 20 of the storage system 10.

As illustrated in FIG. 2 by the dash outlined box with reference number 30, one problem with this approach is that the storage system 10 cannot process client-initiated requests during the time that the operations in the operations log are being replayed (e.g., method operation 24) and system memory is being flushed to disk (e.g., method operation 26). Some client applications may be very sensitive to delays and a timeout error during a data storage operation (e.g., a client-initiated read/write operation) may lead the client to fail or malfunction in some manner. Other client applications—for example, such as a stock exchange trading or quotation application—are extremely time sensitive and therefore any data storage operation is required to have a low latency in order for the application to function properly. Therefore, decreasing the time that the data storage system is unable to process client-initiated requests is desirable.

When two storage systems are configured in a cluster such that one serves as a back-up to the other in the case of a system failure event, a similar problem occurs during the takeover procedure that is initiated after the system failure event. In general, a takeover procedure is the procedure by which a surviving storage system prepares to process client-initiated requests on behalf of the failed storage system. When a takeover procedure takes too long, clients may experience delays and/or timeouts, thereby causing the clients to fail or malfunction in some manner. This problem is illustrated in FIGS. 3 through 5.

Figure 3:
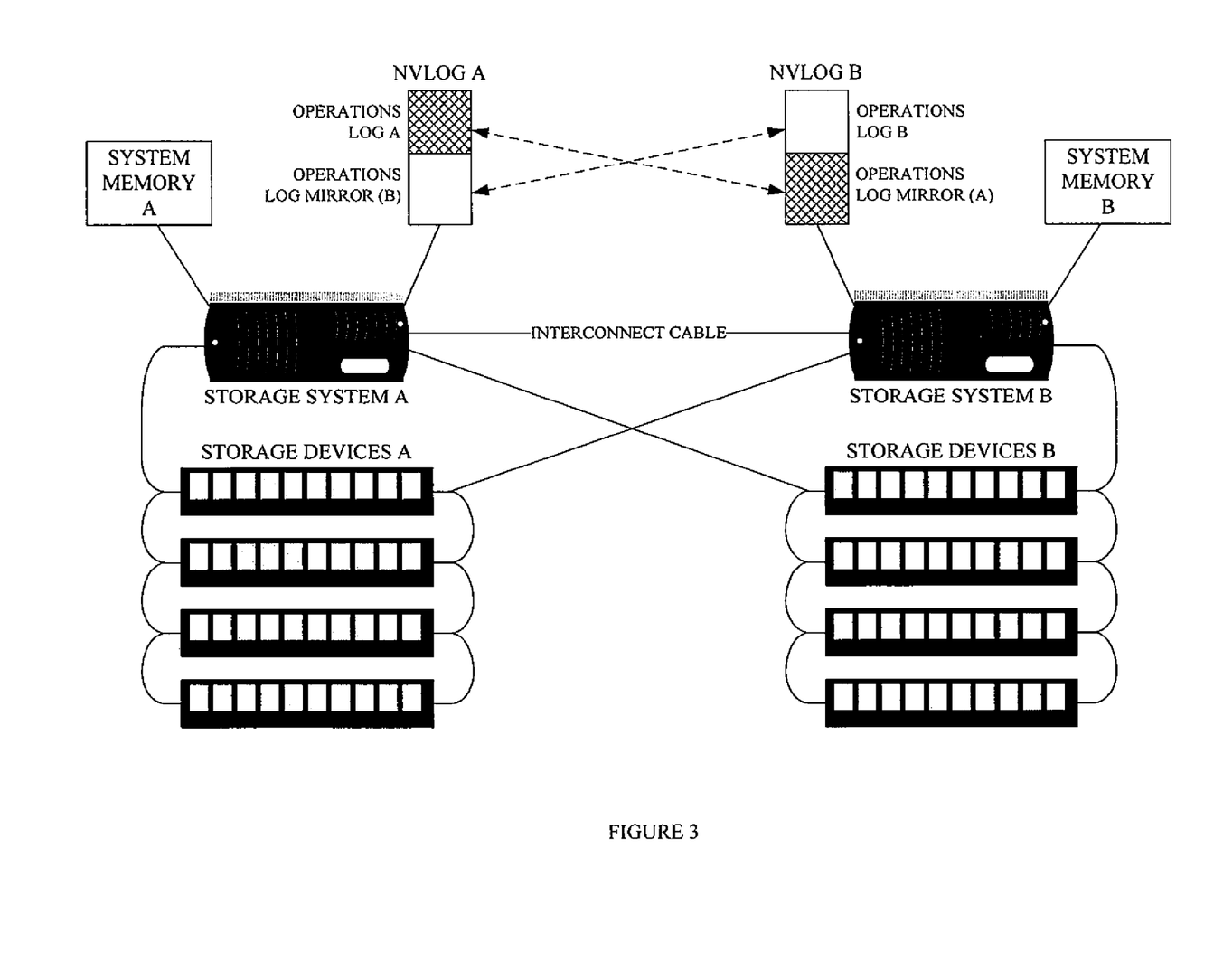
FIG. 3 illustrates two data storage systems in a cluster configuration—according to an embodiment of the invention—such that either system can serve as a back-up system to the other if one system fails.

FIG. 3 illustrates an example of two data storage systems (e.g., storage system A and storage system B) configured in a cluster such that either system can serve as a back-up system to the other in the event one system fails. For instance, during normal operating mode, each data storage system A and B operates independently of the other. In normal operating mode, storage system A provides clients with access to storage devices A, and storage system B provides clients access to storage devices B. Storage system A is said to "own" storage devices A, while storage system B "owns" storage devices B. However, in the case that a system failure occurs at either storage system, a takeover routine is initiated by the surviving storage system to ensure that clients can continue to access data stored on the data storage devices of the failed storage system. Accordingly, as illustrated in FIG. 3, storage system A is coupled not only to storage devices A, but also to storage devices B. Similarly, storage system B is coupled to both storage devices A and storage devices B. Furthermore, each of storage systems A and B includes an interconnect adapter (not shown) by which they are connected to one another via an interconnect cable.

Referring again to FIG. 3, each storage system is shown to include its own system memory (e.g., system memory A and B). In addition, each storage system A and B has a non-volatile memory (e.g., NVLOG A and NVLOG B) where an operations log and log mirror are stored. For example, storage system A is shown to include NVLOG A, which is partitioned to include a first portion (e.g., operations log A) for storing operations directed to storage system A, and a second portion (e.g., operations log mirror (B)) for storing operations directed to storage system B. When a client directs a write command to storage system A, an operation is logged in operations log A of NVLOG A, and the associated data is written to system memory A, where it is stored until a later time when the data is flushed to storage devices A. In addition, the operation is mirrored to operations log mirror (A) of NVLOG B. This allows storage system B to replicate the state of storage system A's system memory (e.g., system memory A), if necessary, during a takeover routine.

Figure 4:
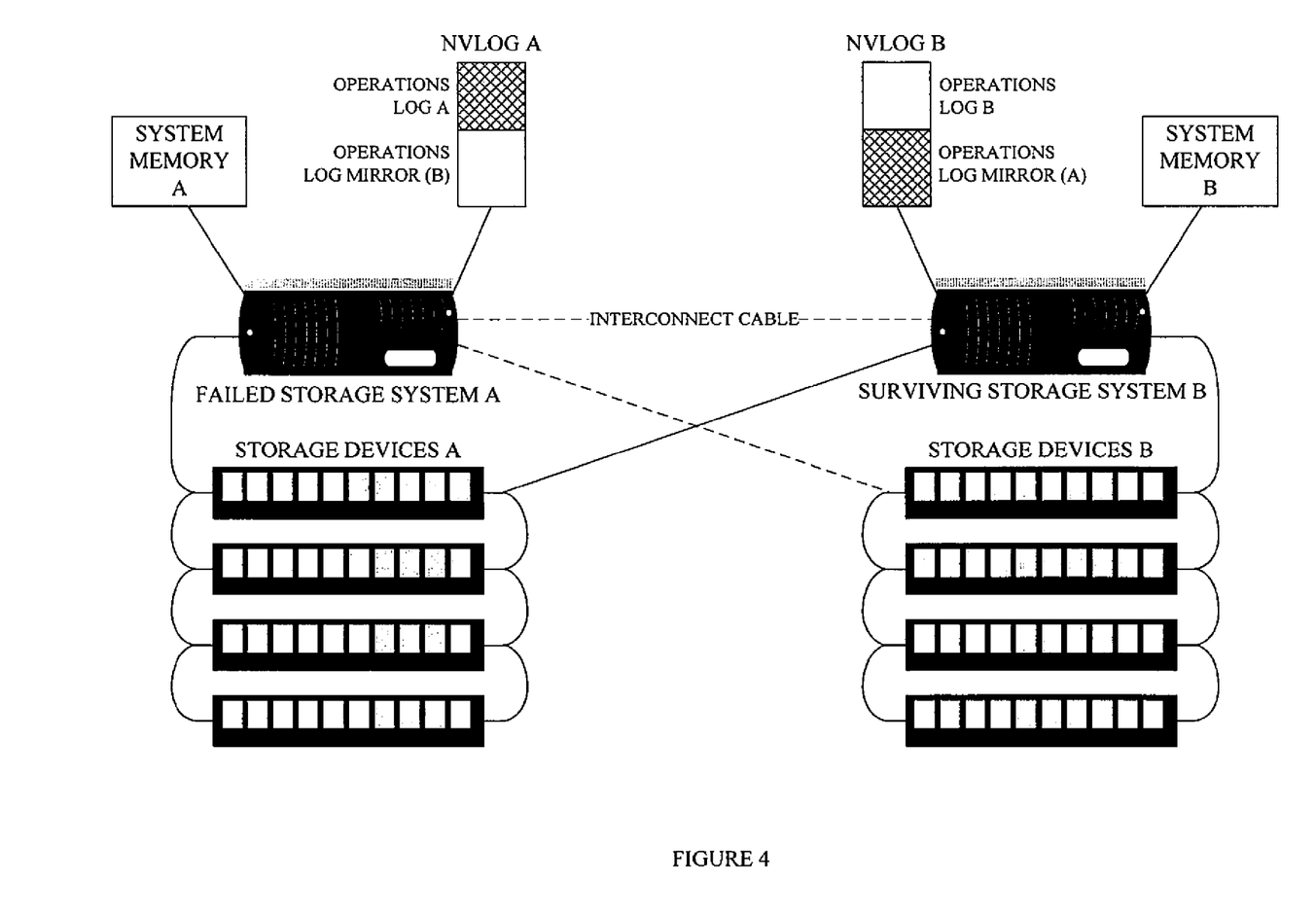
FIG. 4 illustrates two data storage systems (as shown in FIG. 3) after a first system has failed.
Figure 5:
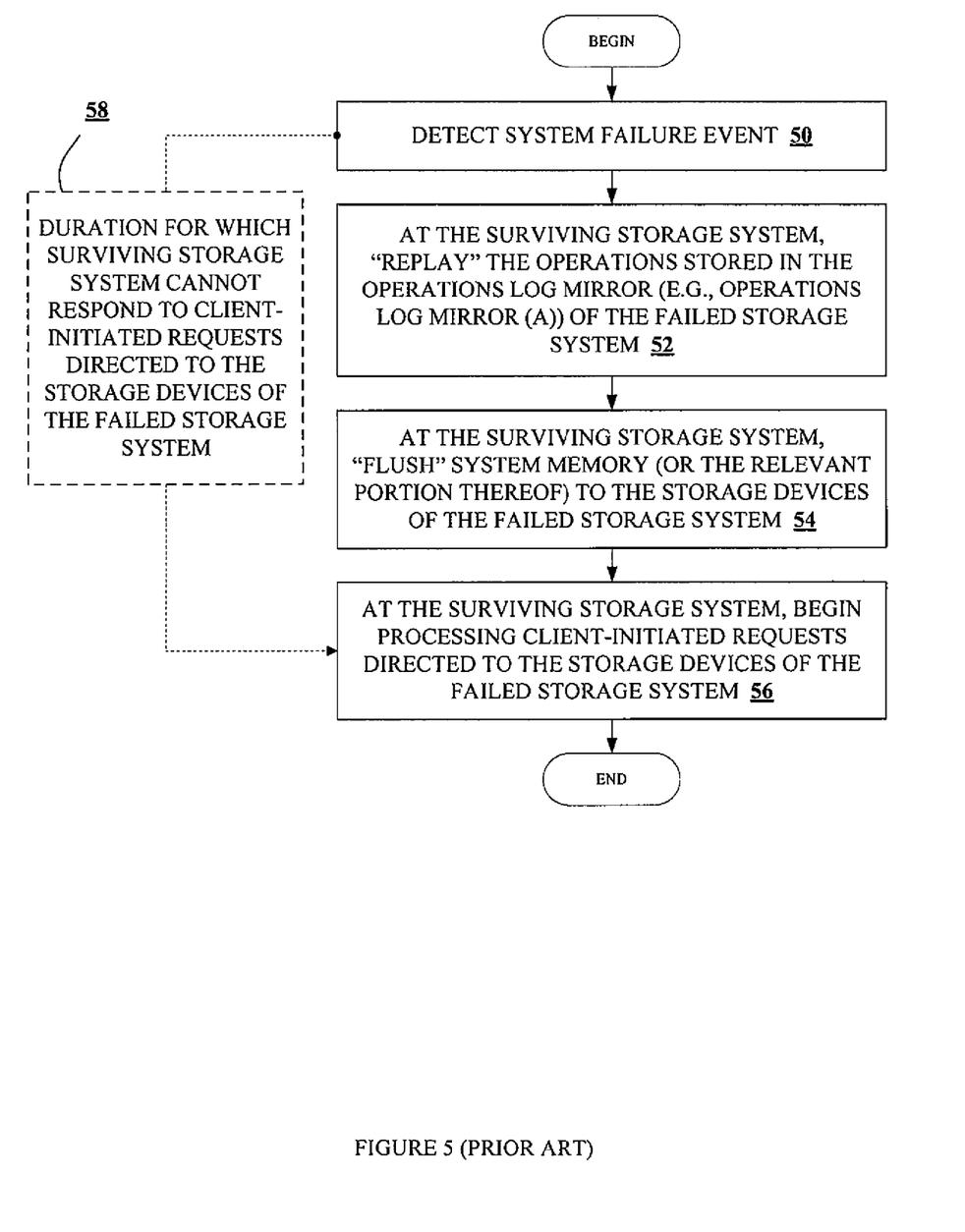
FIG. 5 illustrates a prior art method by which a surviving storage system takes over for a failed storage system in the case when a system failure event occurs.

Referring now to FIG. 4, storage systems A and B are shown after storage system A has experienced a system failure. Accordingly, storage system B is referred to as the surviving storage system, while storage system A is referred to as the failed storage system. When storage system B detects that storage system A has failed, storage system B initiates a takeover procedure so that storage system B can continue providing clients with access to the data on storage devices A.

FIG. 5 illustrates a prior art method for performing such a takeover routine associated with a system failure event at one system in a cluster configuration. At method operation 50 data storage system B detects a system failure event at data storage system A. The system failure event may be detected by B, or alternatively, storage system A may notify storage system B of the system failure event. In any case, after the system failure event, client-initiated requests directed to storage devices A of storage system A will be redirected to and received at surviving storage system B. Storage system B, however, cannot begin processing client-initiated requests directed to storage devices A until storage system B has completed the takeover procedure and initialized the file system of storage devices A. In particular, storage system B must update its system memory to reflect the state of storage system A's system memory at the time storage system A failed. Otherwise, a client-initiated request directed to data that was stored in storage system A's system memory at the time of the system failure event may be processed with incorrect data from storage devices A.

To update its system memory, at operation 52 the surviving storage system B "replays" the operations in the operations log mirror (A) of NVLOG B, thereby writing into system memory B the data contents that were in storage system A's system memory (e.g., system memory A) at the time storage system A failed. Next, at operation 54, the data stored in system memory B (or the relevant portion thereof) are flushed to storage devices A. In this case, the relevant portion of system memory B is the portion of system memory B storing the data generated by replaying the operations log mirror (A). Finally, once the operations log mirror (A) has been replayed, and the system memory flushed to storage devices A, storage system B can resume processing client-initiated requests directed to the storage devices of the failed storage system (e.g., storage devices A of storage system A) at operation 56. In many prior art systems, after the takeover routine has executed, there is a presumption that the storage system has been reset, for example, back to a clean state. That is, there is a presumption that after the takeover routine, the operations log is empty or free, and that all client data have been committed to storage devices.

As with the recovery procedure described above in connection with FIGS. 1 and 2, the takeover procedure creates a situation in which client-initiated requests are subject to timeout. For instance, the dash outlined box with reference number 58 in FIG. 5 indicates time during which the surviving storage system A cannot process client-initiated requests. Specifically, storage system B cannot process client-initiated requests during the time that the operations in the operations log mirror (A) are being replayed (e.g., method operation 52) and system memory B is being flushed to storage devices A (e.g., method operation 54). Therefore, decreasing the time that the data storage system is unable to process client-initiated requests during a takeover procedures is desirable.

SUMMARY

Consistent with one embodiment of the invention, and described herein, is a method by which a first storage system in a pair of clustered storage systems takes over for a failed storage system after a system failure event. Accordingly, after the system failure event, the surviving storage system receives and services client-initiated requests that were previously directed to the failed storage system. However, before servicing any such requests, the surviving storage system "replays" or processes operations in an operations log mirror (e.g., logged operations that have been mirrored from the failed storage device to the surviving storage system) so as to place the system memory of the surviving storage system in a state consistent with the state of the system memory of the failed storage system at the time of the system failure event. Once the operations in the operations log mirror have been replayed, the surviving storage system converts an unused portion of the operations log mirror for use as an operations log by the surviving storage system, and then resumes the processing of client-initiated requests directed to the storage devices of the failed storage system. The storage system utilizes the unused portion of the operations log mirror as an operations log—logging new client-initiated requests to the operations log. When the log reaches a predetermined capacity, or alternatively when system memory reaches a predetermined capacity, the storage system flushes data in the system memory to the appropriate storage devices, and clears the corresponding operations from the operations log.

Consistent with an alternative embodiment of the invention, a standalone storage system rapidly resumes processing client requests after performing a recovery routine during a boot-up procedure. Accordingly, during the boot-up procedure the storage system determines whether a system failure event caused the system to previously shut down. If so, the storage system performs additional operations during the boot-up sequence to recover data that may have been lost during the system failure event. In particular, the storage system processes operations in a non-volatile operations log. By processing the operations in the non-volatile operations log, the storage system places its system memory in a state consistent with the state of the system memory at the time the system failure occurred. Consequently, the storage system can resume processing client-initiated requests—using the unused portion of the operations log to log new client requests—prior to flushing data from its system memory to its storage devices.

Other aspects of the invention are described below in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

In the context of a standalone storage system, an embodiment of the invention provides a method by which the storage system rapidly resumes processing client-initiated requests after a system failure. For example, during the first boot-up sequence after a system failure, the storage system will recover data potentially lost during the system failure by "replaying" operations stored in a non-volatile operations log, thereby placing the system memory of the storage system in the same condition as it was in when the system failure occurred. Once the state of the system memory has been updated to reflect the state of the system memory at the time of the system failure, the storage system resumes processing client-initiated requests. According to prior art recovery methods, client-initiated requests are processed only after the operations log has been replayed and the system memory has been flushed to the storage devices of the storage system. Advantageously, a storage system consistent with an embodiment of the invention decreases the amount of time during which the storage system is unable to process client-initiated requests by using the unused portion of operations log mirror to process client-initiated requests prior to flushing data to storage devices.

In the context of two storage systems in a clustered configuration such that either system can serve as a back-up system to the other in the event one system fails, an embodiment of the invention provides a takeover method by which the surviving storage system rapidly resumes processing client-initiated requests directed to the storage devices of the failed storage system. According to an embodiment of the invention, after a first storage system has failed and during the takeover procedure by the surviving storage system, the surviving storage system "replays" an operations log mirror thereby conditioning the system memory of the surviving storage system to reflect the state of the system memory of the failed storage system at the time of the system failure event. Once the operations log mirror has been replayed at the surviving storage system, and the system memory of the surviving storage system has been updated, the surviving storage system resumes processing client-initiated requests directed to the storage devices of the failed storage system.

In contrast to prior art takeover methods, after replaying the operations log mirror, the surviving storage system does not flush data stored in its system memory to the storage devices of the failed storage system before it resumes processing client-initiated requests directed to the storage devices of the failed storage system. Instead, after the operations stored in the operations log mirror have been replayed, the surviving storage system immediately resumes processing client-initiated requests directed to the storage devices of the failed storage system. As client-initiated requests are processed, the surviving storage system utilizes the portion of the surviving storage system's non-volatile log dedicated to the operations log mirror as a regular operations log. That is, the operations log mirror is used to log new operations as they are processed. When the log reaches a predetermined capacity, or when system memory reaches a predetermined capacity, the relevant portion of the surviving storage system's system memory is flushed to the proper storage devices, and the portion of the non-volatile memory that was previously dedicated for use as an operations log mirror is cleared for continued use as an operations log. Other aspects of the invention are described below in connection with the description of the figures.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 6:
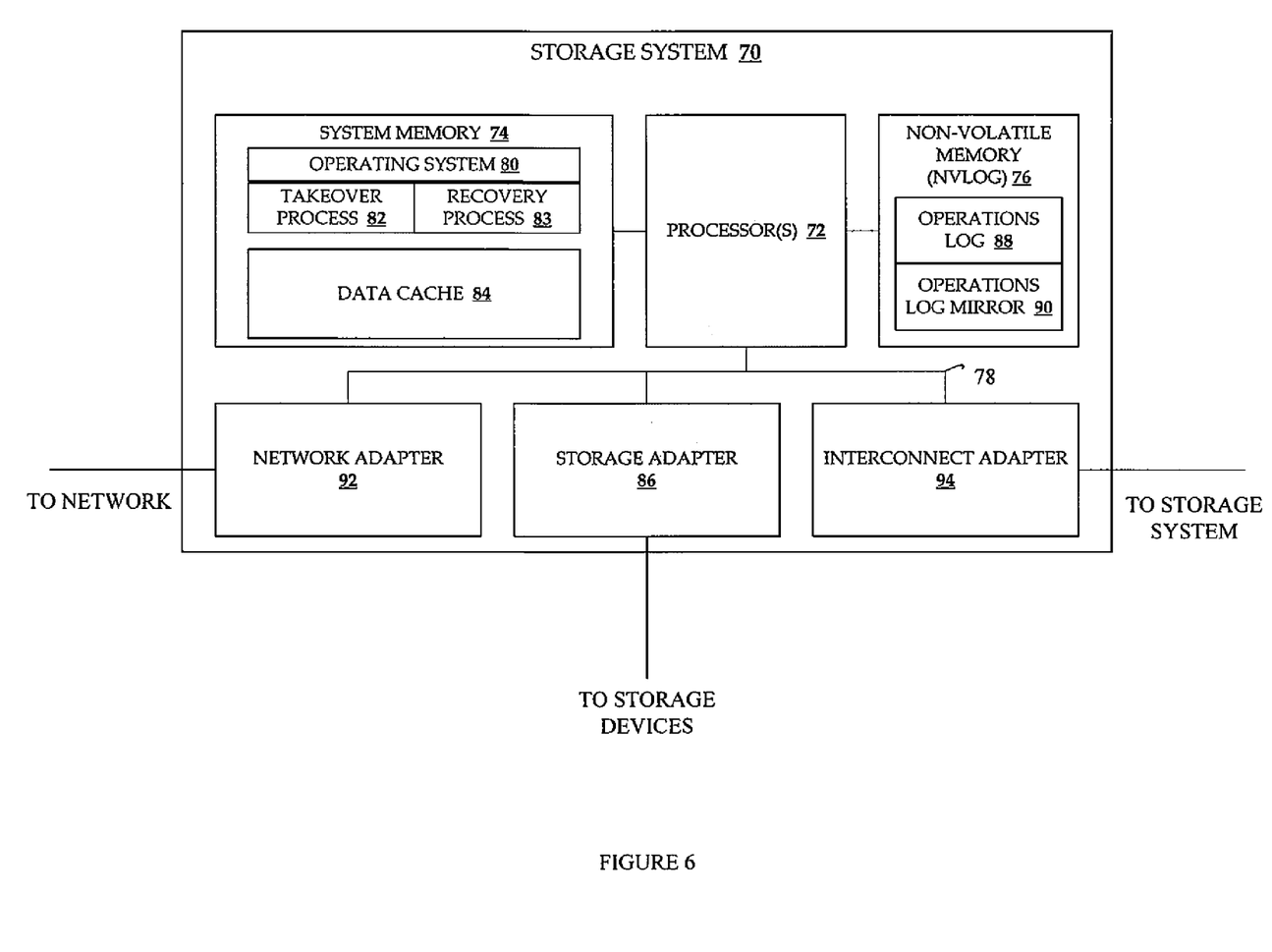
FIG. 6 illustrates a logical block diagram of a storage system, consistent with an embodiment of the invention.

FIG. 6 illustrates a logical block diagram of a storage system 70 configured to operate in a failover cluster, according to an embodiment of the invention. Certain standard and well-known components which are not necessary for understanding the present invention may not be shown. Although the storage system illustrated in FIG. 6 is meant to be representative of a typical storage system, in one particular embodiment of the invention, the storage system (sometimes referred to as a "filer") is consistent with storage systems designed by Network Appliance, Inc. of Sunnyvale, Calif.

As illustrated in FIG. 6, the storage system 70 includes one or more processors 72 coupled to system memory 74 as well as a non-volatile memory 76 by means of a bus system 78. The bus system 78 shown in FIG. 6 is an abstraction that represents any one or more separate physical buses and/or point-to-point connections, connected by appropriate bridges, adapters and/or controllers. The bus system 78, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 72 are the central processing units (CPUs) of the storage system 70 and, thus, execute instructions and control the overall operation of the storage system 72. In certain embodiments, the processor(s) 72 accomplish this by executing software instructions (e.g., applications or procedures) stored in system memory 74. The processor(s) 72 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The system memory 74 is or includes the main memory of the storage system 70. The system memory 74 represents any form of random access memory (RAM), read-only memory (ROM), flash memory, or the like, or a combination of such devices. The system memory 74 stores, among other things, the operating system 80 of the storage system 70, in which the takeover process 82 introduced above can be implemented. In addition, the system memory 74 temporarily stores client generated data in a data cache 84, prior to writing the data to an appropriate storage device via the storage system's storage adapter 86. The system memory 74 is generally a volatile memory device, which loses its data contents when not provided with power.

In addition to the system memory 74, the storage system 70 includes a non-volatile memory 76. In contrast to the system memory 74, the non-volatile memory 76 maintains its data contents in the absence of power. Accordingly, the non-volatile memory 76 includes an operations log for storing client-initiated requests that have been committed to the data cache 84 of the system memory 74, but not yet flushed (e.g., written) to the appropriate storage device. In addition, the non-volatile memory 76 includes an operations log mirror 90 for storing operations that have been committed to the system memory of a partner storage system, but not yet committed to the storage devices of the partner storage system. Accordingly, if a failure event (e.g., a power failure) occurs at the storage system, the operations log 88 of the non-volatile memory 76 can be used to recover any lost client data that was stored in the data cache 84 of the system memory 74 and not yet written to the appropriate storage devices at the time of the failure. Similarly, if the partner storage system fails, the storage system can process the operations in the operations log mirror to recover any data that was lost in the system memory of the partner storage system during the system failure event.

Also connected to the processor(s) 72 through the bus system 78 are one or more internal mass storage devices (not shown), a storage adapter 86, a network adapter 92, and an interconnect adapter 94. The internal mass storage device may be or include any conventional medium for storing large volumes of data in a non-volatile manner, such as one or more magnetic or optical based disks. The storage adapter 86 allows the storage system 70 to access the storage devices of the storage subsystem and may be, for example, a Fibre Channel adapter or a SCSI adapter. The network adapter 92 provides the storage system 70 with the ability to communicate with remote devices, such as clients, over a network and may be, for example, an Ethernet adapter.

When configured in a cluster to provide failover protection and operate in conjunction with a partner storage system, the interconnect adapter 94 of the storage system 70 is a mechanism by which the storage system 70 communicates directly with its partner storage system. For instance, log data may be communicated (e.g., mirrored) to the partner storage system via the interconnect adapter 94. Similarly, each storage system in the cluster may communicate a heartbeat signal periodically to indicate to its partner that it is operating in a normal state. In an alternative embodiment of the invention, the network adapter may serve as the mechanism by which two storage systems communicate with one another. For instance, each storage system may be configured to communicate (e.g., mirror) operations to the other via the network adapter.

In one embodiment of the invention, the operating system 80 of the storage system is a version of the Data ONTAP® operating system available from Network Appliance of Sunnyvale, Calif. Accordingly, the storage system may operate with a write anywhere file layout (WAFL®) file system. Accordingly, the storage system 70 logically organizes data (e.g., files) into a hierarchical structure, and stores the data as blocks on disks.

Figure 7:
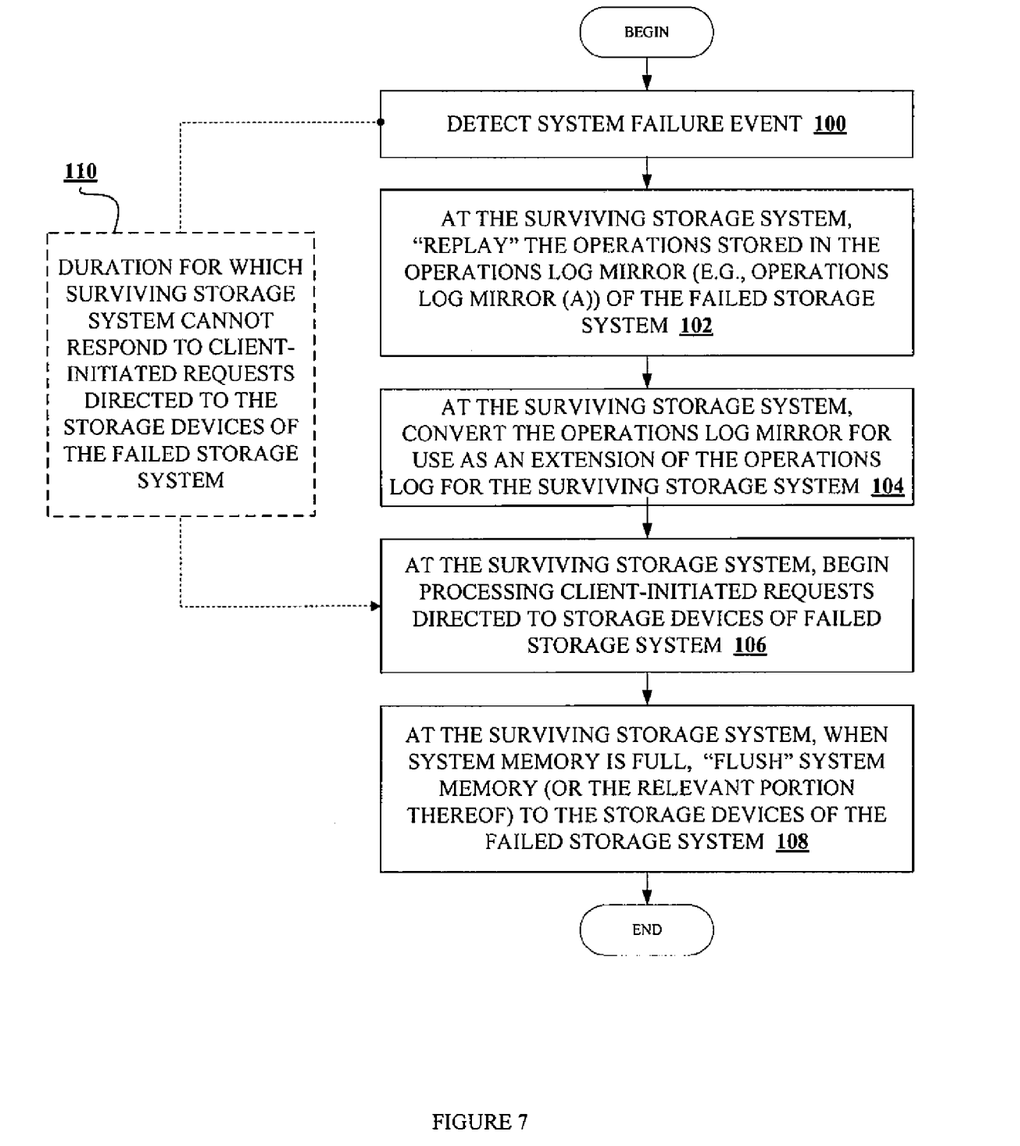
FIG. 7 illustrates a method, according to an embodiment of the invention, by which a surviving storage system takes over for a failed storage system in the case when a system failure event occurs.

FIG. 7 illustrates a method, according to an embodiment of the invention, by which a storage system performs a takeover process in response to a system failure event. At operation 100 a system failure event is detected. In general, a system failure event is any error or system failure that prevents a data storage system from operating in a normal state and/or reliably servicing client-initiated requests. By way of example, a system failure event may be caused by a storage system losing power (e.g., a power failure), a disk failure (e.g., a mechanical failure), or a network failure that isolates a storage system. In any case, at operation 100, a system failure event is detected.

The manner in which a storage system determines that a system failure event has occurred may vary and depend upon the particular configuration of the storage systems. For example, in one embodiment of the invention, the storage systems may periodically communicate a "heart beat" signal to one another over a direct communication channel, such as the interconnect cable connecting the two storage systems as illustrated in FIG. 3. So long as a storage system receives the "heart beat" signal from its partner system as expected, each storage system operates in a normal state. However, the absence of such a signal may indicate that a system failure event has occurred at the partner storage system. Alternatively, one storage system may directly communicate a message to the other storage system to indicate that a system failure event has occurred. For example, in one embodiment of the invention, after a storage system detects its own system failure event, that storage system may communicate a message over a network connection, or an interconnect cable, to its partner storage system, indicating that a system failure event has occurred. In yet another embodiment, a storage location on a shared disk may be configured as a "mailbox" such that, one storage system can write a message to the mailbox to inform the other storage system of a system failure event. Accordingly, each storage system may be configured to periodically read from the designated storage location to determine if a message has been written by a partner storage system.

Regardless of the particular manner or method used to inform the surviving storage system of the system failure event, because of the system failure event, the surviving storage system receives client-initiated requests that would otherwise have been directed to the failed storage system. However, before servicing any such requests, the surviving storage system must recover any data that may have been in the failed storage system's system memory at the time of the system failure, and therefore may have been lost.

Accordingly, at operation 102, the surviving storage system "replays" the operations stored in the operations log mirror of its non-volatile memory (e.g., operations log mirror A in NVLOG B in FIG. 4). For example, the surviving storage system processes the operations that are stored in the operations log mirror, thereby conditioning the system memory (e.g., system memory B in FIG. 4) of the surviving storage system to reflect the state of the system memory (e.g., system memory A) of the failed storage system at the time of the system failure event. In this context, conditioning the system memory simply means to place the system memory in a state equivalent to the state the system memory was in at the time of the system failure event by writing data to the system memory in accordance with the instructions processed during the replay of the operations log mirror.

Next, at operation 104, the surviving storage system prepares the unused portion of the operations log mirror for use as an operations log for the surviving storage system. For instance, the portion of the non-volatile memory that is dedicated to the operations log mirror will generally have an unused or free portion. That unused portion of the operations log mirror is converted for use as an operations log for the surviving storage system. As the surviving storage system receives new client-initiated requests directed to the storage devices of the surviving storage system, or the storage devices of the failed storage system, the surviving storage system is able to log the operations to the unused portion of the operations log mirror which has been converted for use as a regular operations log.

At operation 106, the storage system begins processing client-initiated requests directed to the storage devices of the failed storage system. Because the operations log mirror has been replayed, and the system memory of the surviving storage system is now in a state consistent with the state of the system memory of the failed storage system, the surviving storage system can resume processing client-initiated requests. If a client-initiated read request is directed to data stored in system memory, the storage system simply reads the data from its system memory. However, if a client-initiated read request is directed to data stored in a storage device of the failed storage system, the surviving storage system reads the data from the storage devices of the failed storage system. In any case, during the takeover process, the surviving storage system is able to resume processing client-initiated requests much sooner than it would have, had it waited to begin processing of requests until it flushed data generated by replaying the operations log mirror to the storage devices of the failed storage system.

At operation 108, when the system memory (e.g., the data cache) becomes full, the contents of system memory are "flushed" (e.g., written) to the appropriate storage devices. Alternatively, the surviving storage system may flush the contents of system memory to the appropriate storage devices when the system memory reaches a predetermined capacity (e.g., prior to becoming full), or upon the occurrence of some other predetermined event, or at some other predetermined point in time. For example, the surviving storage system may flush the contents of system memory to the appropriate storage devices when the operations log (e.g., the previously unused portion of the operations log mirror) reaches a predetermined capacity, such as a certain percentage (e.g., 50%) of its full capacity. In general, the predetermined capacity of the system memory or operations log, at which point a flushing operation occurs, is determined so as to avoid a situation where the system memory, or the operations log, fills completely, thereby preventing the storage system from processing new incoming client-initiated requests. Therefore, by setting the threshold for triggering a flushing operation at some predetermined capacity (less than full capacity), the storage system is able to ensure clients stable storage. In any case, as data in the system memory are flushed to the appropriate storage devices, the associated logged operations are cleared from the corresponding log in the non-volatile memory, thereby freeing space in the log where new operations can be logged. Accordingly, when the system memory is flushed to disk, the entire portion of the non-volatile memory that was previously dedicated for use as an operations log mirror is made available to the surviving storage system for use as an operations log.

Advantageously, a takeover process or method consistent with the present invention enables the storage system to rapidly resume the processing of client-initiated requests directed to the storage devices of the failed storage system. For instance, as illustrated by the dash outlined box with reference number 110 in FIG. 7, the surviving storage system is prevented from processing client-initiated requests directed to the storage devices of the failed storage system for only so long as is needed to replay the operations in the operations log mirror (e.g., method operation 102) and convert the unused portion of the operations log mirror for use as an operations log (e.g., method operation 104). Because neither of these processing operations (e.g., method operations 102 and 104) involve writing data to the storage devices, the processing operations can be completed rapidly with limited delay in processing client-initiated requests.

Figure 8:
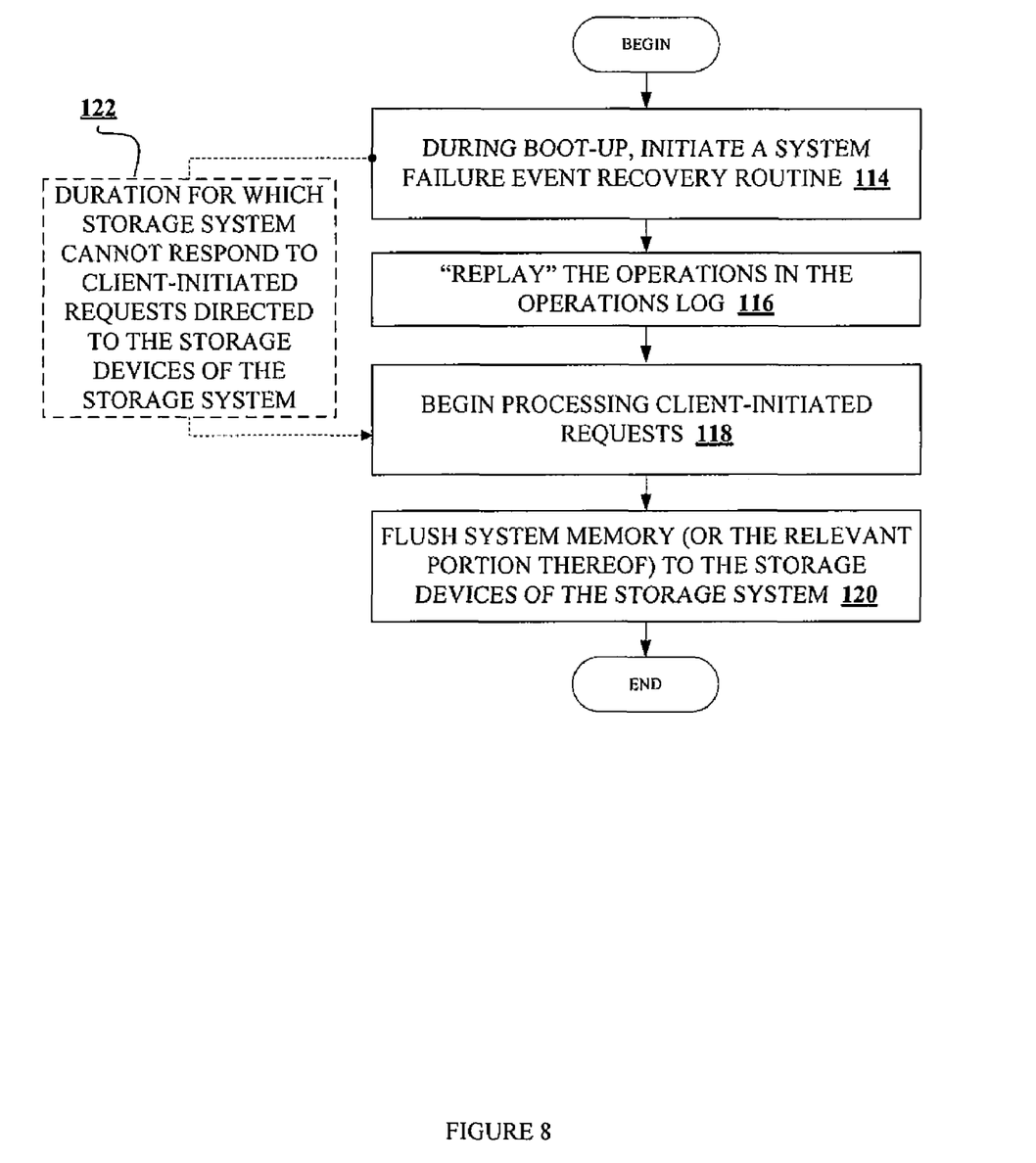
FIG. 8 illustrates a method, according to an embodiment of the invention, by which a data storage system recovers from a failure event.

FIG. 8 illustrates a method, according to an embodiment of the invention, by which a standalone storage system performs a recovery process in response to a failure event. Similar to the method described in connection with FIG. 7, the method of FIG. 8 enables a storage system to rapidly resume processing client-initiated requests after a system failure event.

At operation 114, during the boot-up procedure, a storage system initiates a recovery routine in response to a previous failure event. Because of the previous failure event, client generated data stored in the volatile system memory may have been lost. Therefore, the recovery routine is executed to recover any such data, by processing any operations that were logged in an operations log of the non-volatile memory. Until the operations log has been processed, the storage system is unable to process client requests.

At operations 116, the operations in the operations log (e.g., operations log of NVLOG 18 in FIG. 1) are "replayed", thereby conditioning the system memory of the storage system to the state that it was in when the failure event initially occurred. Next, at operation 118, the storage system resumes processing client-initiated requests, logging newly processed operations to the unused portion of the operations log. At operation 120, the storage system flushes data from system memory to the appropriate storage devices, thereby freeing space in the operations log so that new operations can be processed into memory and logged.

Advantageously and in contrast to prior art recovery methods, data generated during method operation 116 (e.g., replaying the operations log) are not flushed to storage devices prior to resuming the processing of client-initiated requests. Consequently, the storage system can rapidly enter a normal operating state and resume processing client requests during the boot-up sequence. As illustrated by the dash outlined box with reference number 122, the storage system is only unavailable to process client requests so long as is necessary to replay the operations in the operations log (e.g., method operation 116).

In one embodiment of the invention, the methods described herein may be embodied as a sequence or series of instructions stored on a computer- or machine-readable medium. While the machine-readable medium may be a single medium, the term "machine-readable medium" should be taken to include a single medium or multiple media (e.g., memory or storage components) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals. Finally, the illustrative method operations, which may be performed by a computer-implemented program (e.g., instructions), may be executed simultaneously, or in a different order than described above, and additional processing steps may be incorporated. Furthermore, various aspects of the invention may be implemented in hardware, software, or a combination thereof.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. In general, the scope of the invention is defined by the claims and their equivalents.

The invention claimed is:

1. A method comprising:
upon detecting a system failure event, processing operations in an operations log mirror so as to place system memory of a surviving storage system in a state consistent with the state of system memory of the failed storage system at the time of the system failure event;
converting an unused portion of the operations log mirror for use as an operations log by the surviving storage system; and
processing client-initiated requests directed to storage devices of the failed storage system.

2. The method of claim 1, wherein processing client-initiated requests directed to the storage devices of the failed storage system includes utilizing the converted portion of the operations log mirror as an operations log for the surviving storage system by storing client-initiated requests therein.

3. The method of claim 1, further comprising:
flushing data stored in system memory of the surviving storage system to storage devices of the failed storage system when the converted portion of the operations log mirror fills to a predetermined capacity.

4. The method of claim 3, further comprising:
after flushing data stored in system memory of the surviving storage system to storage devices of the failed storage system, converting the entire operations log mirror for use as an operations log by the surviving storage system.

5. The method of claim 1, further comprising:
flushing data stored in system memory of the surviving storage system to storage devices of the failed storage system when the system memory of the surviving storage system fills to a predetermined capacity.

6. The method of claim 5, further comprising:
after flushing data stored in system memory of the surviving storage system to storage devices of the failed storage system, converting the entire operations log mirror for use as an operations log by the surviving storage system.

7. The method of claim 1, wherein processing operations in an operations log mirror so as to place system memory of a surviving storage system in a state consistent with the state of system memory of the failed storage system at the time of the system failure event includes writing data to the system memory of the surviving storage system, wherein said data reflects the most recent state of a file system maintained by the failed storage system.

8. A storage system comprising:
a processor to execute instructions for processing client-initiated requests;
a system memory including a portion configured to temporarily store data associated with client-initiated requests until the data are flushed to a storage device;
a non-volatile memory including an operations log for temporarily logging client-initiated requests processed into the system memory of the storage system, and an operations log mirror for temporarily logging operations processed into system memory of a partner storage system; and
takeover logic configured to i) process the operations stored in the operations log mirror so as to condition the state of the system memory of the storage system to reflect the state of the system memory of a failed partner storage system at the time of a system failure event, ii) convert an unused portion of the operations log mirror for use as an operations log by the storage system, and iii) begin processing client-initiated requests directed to storage devices of the failed partner storage system.

9. The storage system of claim 8, wherein the takeover logic is configured to begin processing client-initiated requests directed to storage devices of the failed partner storage system prior to flushing data in the system memory to the storage devices of the failed partner storage system.

10. The storage system of claim 8, further comprising:
an interconnect adapter by which the storage system is communicatively coupled to the partner storage system to receive client-initiated requests to be stored in the operations log mirror of the storage system, wherein the client-initiated requests are initially received, and logged, at the partner storage system prior to the system failure event.

11. The storage system of claim 8, further comprising:
a network adapter by which the storage system is communicatively coupled to a client from which it receives client-initiated requests to be stored in the operations log, wherein the client-initiated requests are initially received, logged, and processed into system memory, prior to being flushed to a storage device of the storage system.

12. The storage system of claim 8, further comprising:
a storage adapter by which the storage system is communicatively coupled to one or more storage devices, wherein said storage devices store data associated with the client-initiated requests.

* * * * *